United States Patent
Vedula (10) Patent No.: US 10,521,083 B2
(45) Date of Patent: *Dec. 31, 2019

(54) OBJECT BASED BROWSING SUITABLE FOR USE IN APPLICATIONS

(71) Applicant: Oracle International Corporation, Redwood Shores, CA (US)

(72) Inventor: Venkata Naga Ravi Kiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/583,796

(22) Filed: May 1, 2017

(65) Prior Publication Data
US 2017/0235447 A1    Aug. 17, 2017

Related U.S. Application Data

(63) Continuation of application No. 11/781,273, filed on Jul. 23, 2007, now Pat. No. 9,639,236.

(51) Int. Cl.
 G06F 9/44      (2018.01)
 G06F 3/0482    (2013.01)
 G06F 3/0489    (2013.01)

(52) U.S. Cl.
 CPC .......... *G06F 3/0482* (2013.01); *G06F 3/0489* (2013.01)

(58) Field of Classification Search
 CPC .................................................. G06F 3/0482
 USPC ........................................................ 717/116
 See application file for complete search history.

(56) References Cited

U.S. PATENT DOCUMENTS

| | | | |
|---|---|---|---|
| 5,664,133 A * | 9/1997 | Malamud | G06F 3/0482 345/902 |
| 5,838,326 A | 11/1998 | Card et al. | |
| 5,983,227 A | 11/1999 | Nazem et al. | |
| 6,307,544 B1 * | 10/2001 | Harding | G06F 9/453 715/709 |
| 7,149,959 B1 * | 12/2006 | Jones | G06Q 10/06 715/234 |
| 7,158,986 B1 | 1/2007 | Oliver et al. | |
| 7,228,494 B2 | 6/2007 | Kapoor et al. | |
| 7,546,550 B1 * | 6/2009 | Buck | G06F 3/0482 715/834 |
| 7,721,228 B2 | 5/2010 | Burke et al. | |
| 7,793,213 B2 | 9/2010 | Shmukler et al. | |
| 8,438,539 B2 | 5/2013 | Hertenstein | |
| 9,639,236 B2 | 5/2017 | Vedula | |

(Continued)

OTHER PUBLICATIONS

U.S. Appl. No. 11/781,273, Advisory Action dated Feb. 13, 2013, 2 pages.

(Continued)

*Primary Examiner* — Evral E Bodden
(74) *Attorney, Agent, or Firm* — Kilpatrick Townsend & Stockton, LLP (57) ABSTRACT

A method, system and computer program product for object based browsing suitable for use in various applications is provided. The method includes receiving one or more working lists. Thereafter, one or more rules corresponding to the one or more working lists are checked. One or more context menus for the one or more working lists are then dynamically generated based on the checking.

20 Claims, 4 Drawing Sheets

(56) References Cited

U.S. PATENT DOCUMENTS

| | | | |
|---|---|---|---|
| 2005/0108406 A1* | 5/2005 | Lee | G06F 16/9535 709/228 |
| 2005/0203925 A1 | 9/2005 | Kapoor et al. | |
| 2006/0036945 A1* | 2/2006 | Radtke | G06F 9/451 715/708 |
| 2008/0222664 A1* | 9/2008 | Tsao | G06F 9/4488 719/328 |
| 2009/0007062 A1* | 1/2009 | Gilboa | G06Q 10/06 717/105 |
| 2009/0024983 A1 | 1/2009 | Vedula | |
| 2012/0233570 A1 | 9/2012 | Li et al. | |

OTHER PUBLICATIONS

U.S. Appl. No. 11/781,273, Advisory Action dated Jan. 13, 2012, 3 pages.

U.S. Appl. No. 11/781,273, Final Office Action dated Nov. 4, 2011, 36 pages.

U.S. Appl. No. 11/781,273, Final Office Action dated Feb. 26, 2016, 44 pages.

U.S. Appl. No. 11/781,273, Final Office Action dated Jan. 7, 2013, 47 pages.

U.S. Appl. No. 11/781,273, Final Office Action dated Nov. 7, 2013, 54 pages.

U.S. Appl. No. 11/781,273, Non Final Office Action dated Aug. 20, 2015, 38 pages.

U.S. Appl. No. 11/781,273, Non Final Office Action dated Jun. 7, 2013, 47 pages.

U.S. Appl. No. 11/781,273, Non-Final Office Action dated Aug. 15, 2012, 38 pages.

U.S. Appl. No. 11/781,273, Notice of Allowance dated Dec. 20, 2016, 8 pages.

* cited by examiner

| S. No. | Request Date | Priority | Status | Notes |
|---|---|---|---|---|
| 1 | June 1, 2007 | 2 | Working | --- |
| 2 | June 2, 2007 | 4 | Closed | --- |
| 3 | June 3, 2007 | 2 | Working | ESC |
| 4 | June 3, 2007 | 3 | Unassigned | --- |

302a

| User ID | User Name | Email | Phone | ID |
|---|---|---|---|---|
| RKiran | Ravi Kiran | R.K@co.com | 123 | RK |
| TJohn | Thomas | T@co.com | 234 | T |
| RVerma | Ramesh | RV@co.com | 2345 | RV |

302b

304a
S. No. 3
Menu: EMPTY

304b
S. No. 3   RV
Menu: ASSSIGN S. No. 3 to USER

304c
S. No.      3
Comments    High Priority. System is affected
USER        RV
Send Mail   [Y]   [Submit]

OBJECT BASED BROWSING SUITABLE FOR USE IN APPLICATIONS

CROSS-REFERENCES TO RELATED APPLICATIONS

The present application is a continuation of U.S. Nonprovisional application Ser. No. 11/781,273, filed Jul. 23, 2007, the entire disclosure of which is hereby incorporated by reference for all purposes.

BACKGROUND OF THE INVENTION

1. Technical Field

Embodiments of the invention relate generally to the field of browsing in applications and more particularly to a method, system, and computer program product for object based browsing suitable for use in the applications.

2. Prior Art

Various applications such as computer applications have a user interface to enable users to browse through these applications. The user interface aims to improve the efficiency, effectiveness, and naturalness of interaction between a user and an application. The design of the user interface affects the amount of effort the user needs to expend to provide input to the application and to interpret the output of the application. Therefore, efficient and easy to use user interfaces are required.

Currently, there are various user interfaces available. However, these user interfaces follow a command-oriented approach and require the user to follow a navigation sequence of the application. For example, to add an object to a workspace in the application and then to send a document to the object from the workspace, the user needs to search for the workspace and then use the wizard steps to add the object to the workspace. Further, the user needs to follow another set of steps to send the document to the object. The user is allowed to do only one operation at a time. Moreover, learning the navigation sequence of the application consumes time. The user has to be trained whenever a new feature is added to the application.

In light of the foregoing discussion, a method, system, and computer program product for efficient browsing is needed. Further, a browsing technique that does not require the user to learn navigation sequence of the application is needed. Moreover, addition of new features in the application should be easy without the need to train the user.

BRIEF SUMMARY OF THE INVENTION

An object of the invention is to provide efficient browsing in various applications.

Embodiments of the invention described herein provide a method, system, and computer program product for browsing in various applications. In an embodiment of the invention, the method includes checking one or more rules for one or more working lists. Thereafter, one or more context menus for the one or more working lists are dynamically generated based on the checking.

In another embodiment of the invention, a system for browsing in various applications is provided. The system includes a checking module for checking one or more rules for one or more working lists. A generating module is then used to dynamically generate one or more context menus for the one or more working lists based on the checking.

In yet another embodiment of the invention, a computer program product for browsing in various applications is provided. The computer program product includes a computer readable program code. The computer readable program code performs checking one or more rules for one or more working lists. Thereafter, one or more context menus for the one or more working lists are dynamically generated based on the checking.

The dynamic generation of the one or more context menus provides efficient browsing in the applications. Further, one or more users are not required to learn navigation sequences of the applications. Moreover, addition of new features in the one or more context menus does not require training the one or more users.

This summary is not intended to describe each embodiment of the invention. The Detailed description and Figures that follow provide additional aspects of embodiments of the invention.

DETAILED DESCRIPTION OF THE INVENTION

Various embodiments of the invention provide a method, system, and computer program product for object based browsing in various applications. The method includes receiving one or more working lists for one or more users. The one or more users select one or more objects, which constitute one or more working lists of the one or more users. Upon receipt of the one or more working lists, one or more rules for the one or more working lists are checked. One or more context menus corresponding to the one or more working lists are then dynamically generated based on the checking.

Figure 1:
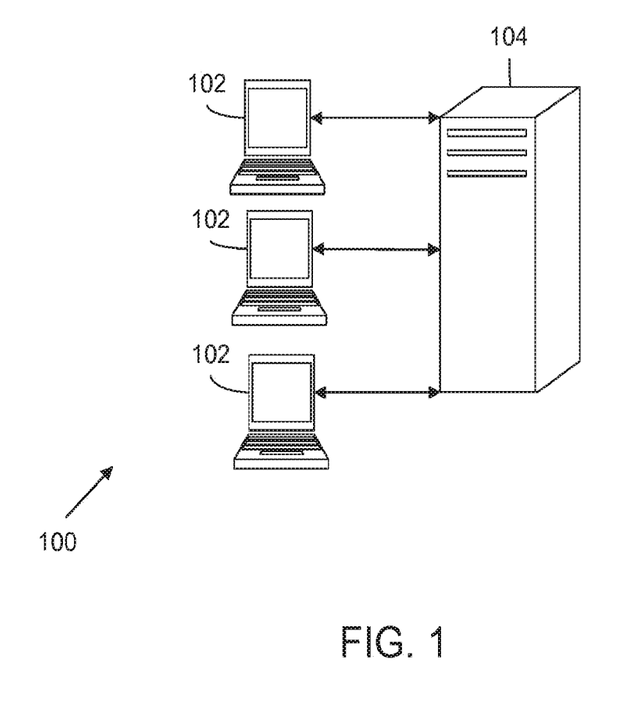
FIG. 1 is a schematic representation of an environment in which various embodiments of the invention may be practiced.

FIG. 1 is a schematic representation of an environment 100 in which various embodiments of the invention may be practiced. Environment 100 includes one or more devices 102 and a server 104. One or more devices 102 run applications and are connected to server 104. Server 104 runs software providing access to data stored in a database.

Examples of one or more devices 102 include but are not limited to data processing units, computers, laptops, personal digital assistants (PDAs), and cell phones. Examples of server 104 include but are not limited to application servers and middleware business applications. Server 104 may be present on one or more devices 102. Server 104 may support a data oriented servlet for providing data to one or more devices 102.

Examples of the applications include but are not limited to business applications, web applications, collaboration suites, and enterprise applications. The applications running on one or more devices 102 include one or more user interfaces. The one or more user interfaces enable one or more users to browse through the applications. A system includes various modules for efficient browsing through the applications. The system including these modules has been explained in details in conjunction with FIG. 2.

Figure 2:
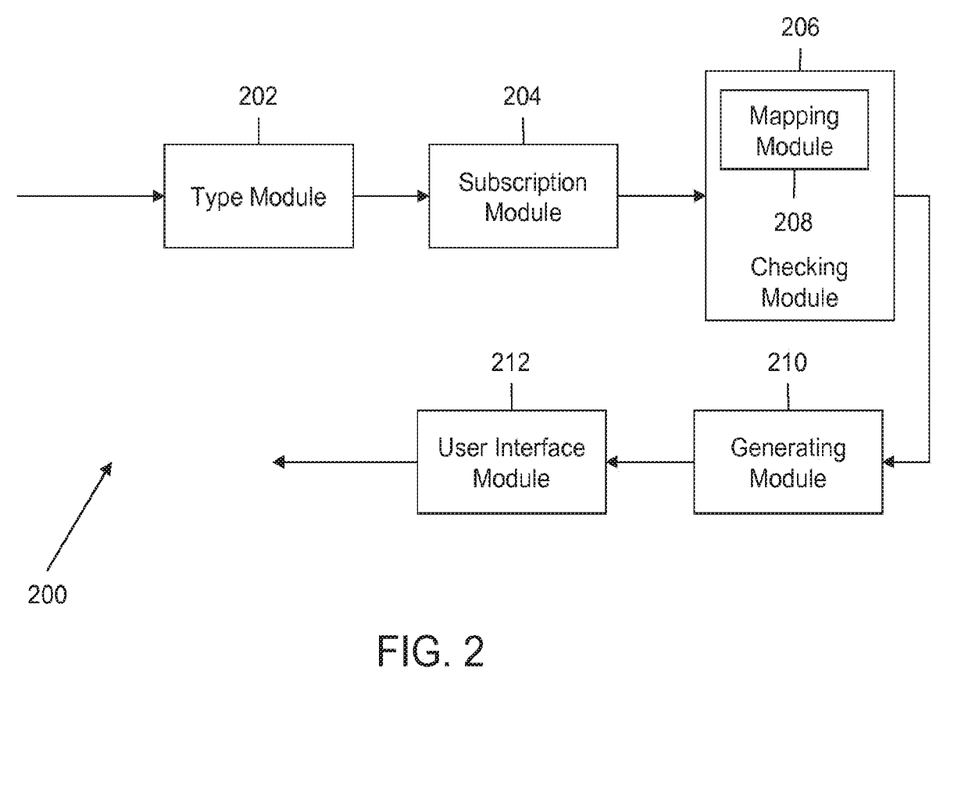
FIG. 2 is a schematic representation of a system for object based browsing in applications in accordance with an embodiment of the invention.

FIG. 2 is a schematic representation of a system 200 for object based browsing in applications in accordance with an embodiment of the invention. System 200 includes a type module 202, a subscription module 204, a checking module 206, including a mapping module 208, a generating module 210 and a user interface module 212. Type module 202 determines types of one or more objects. Subscription module 204 then provides one or more subscriptions for the one or more objects. The one or more objects constitute one or more working lists. Checking module 206 checks one or more rules for the one or more working lists. Mapping module 208 maps the one or more subscriptions of the one or more objects. Generating module 210 then dynamically generates one or more context menus for the one or more working lists based on the checking. User interface module 212 then provides one or more user interfaces for displaying the one or more context menus.

Examples of the one or more objects include but are not limited to calendar entries, users, groups, documents and emails. Examples of the types of the one or more objects include but are not limited to user types, document types, meeting types, email types, service types and workspace types.

In an embodiment of the invention, the working list may include the one or more objects along with the types of the one or more objects. For example, an administrator selects two service requests SRI and SR2, and two user s UI and U2 for assigning SRI and SR2 then the working list of the administrator may include two service type objects SRI and SR2, and two user type objects UI and U2.

In an embodiment of the invention, subscription module 204 provides the one or more subscriptions for the one or more objects based on one or more login details. The one or more login details are received when the one or more users login to the applications running on one or more devices I 02. For example, if an object that is selected is a user and login details are of an administrator then subscription for the user may include "add the user" and "delete the user", while if the login details are of a normal user then the subscription for the user may include "send a request to the administrator to add the user" and "send a request to the administrator to delete the user".

In an embodiment of the invention, the one or more rules may be defined by the one or more users. The one or more rules defined by the one or more users may then be saved for future use. In another embodiment of the invention, the one or more rules may be predefined. For example, if a working list includes three object types Oa, Ob and Oc then an exemplary ruleR may be Oa (1), Ob (>2), and Oc (Oil)=>M. RuleR may be read as if one instance of type Oa, greater than two instances of type Ob and zero or one instance of type Oc is present then include operation M in context menu for the working list.

In an embodiment of the invention, the one or more rules may be a sequence of the one or more objects with cardinality.

In an embodiment of the invention, the one or more objects may be identical with respect to their capabilities to participate in an operation.

In an embodiment of the invention, the one or more context menus may include one or more operations. Examples of the one or more operations include but are not limited to "add user to a workspace", "send a document to the user" and "remove the document from the workspace".

Examples of the one or more user interfaces include but are not limited to pull down menus, drop down menus, menu of commands, menu of options, display screens, keyboard shortcuts, illuminated characters, and help messages. In an embodiment of the invention, the one or more user interfaces may be customized based on preferences of the one or more users.

System 200 described above may include a greater or a fewer number of modules than those included in FIG. 2. An exemplary representation of the one or more user interfaces has been explained in details in conjunction with FIG. 3.

Figure 3:
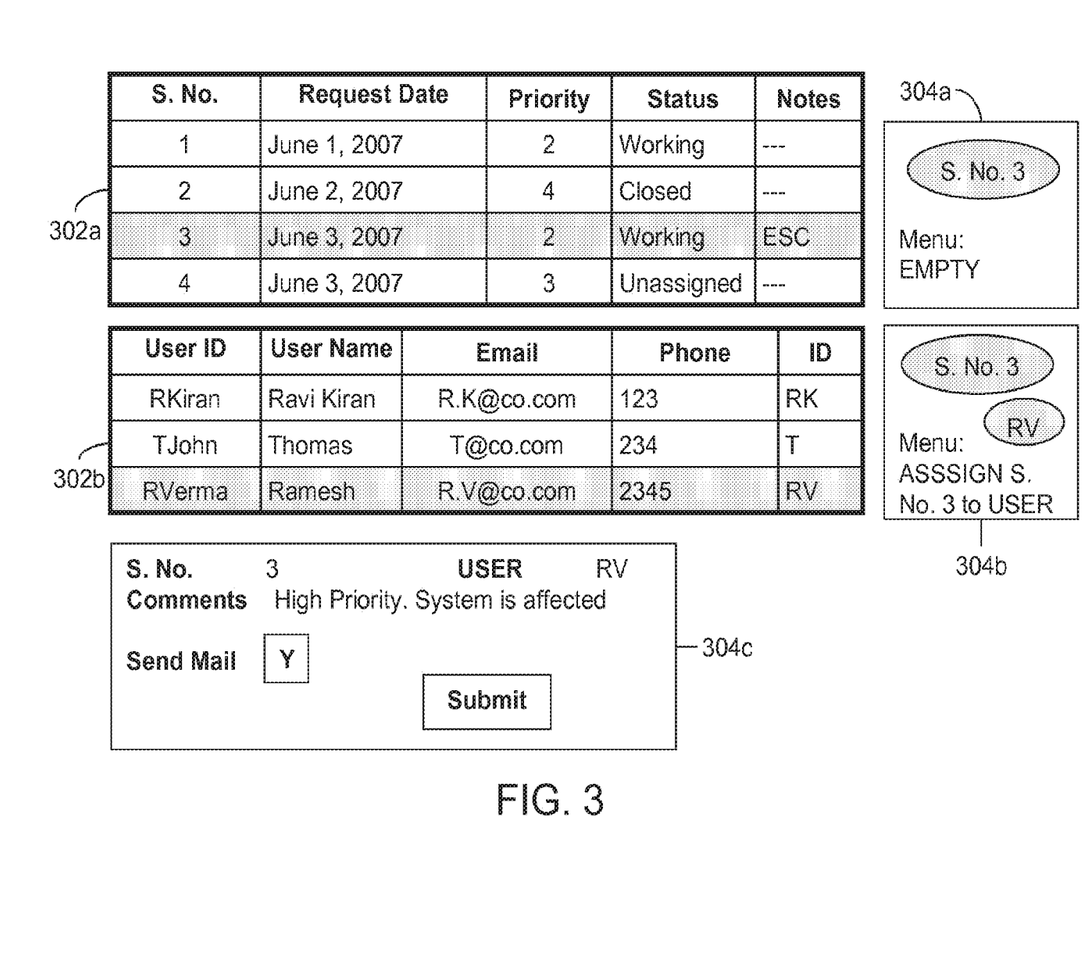
FIG. 3 is an exemplary representation of one or more user interfaces in accordance with an embodiment of the invention.

FIG. 3 is an exemplary representation of one or more user interfaces in accordance with an embodiment of the invention. FIG. 3 includes a plurality of tables including a table 302 and a table 302*b*, and one or more user interfaces including a user interface 304*a*, a user interface 304*b* and a user interface 304*c*. Table 302*a* and table 302*b* include one or more objects. One or more users select one or more objects to create one or more working lists. One or more user interfaces display one or more working lists, for example, user interface 304*b* displays a working list including S. No. 3 and RV, and one or more context menus, for example, user interface 304*c* displays send mail menu. User interface 304*c* is provided when a user clicks on "ASSIGNS. No. 3 to USER" of user interface 304*b*.

In an embodiment of the invention, user interface 304*a*, user interface 304*b* and user interface 304*c* may be provided automatically. In another embodiment of the invention, user interface 304*a*, user interface 304*b* and user interface 304*c* may be provided based on inputs from the one or more users.

Figure 4:
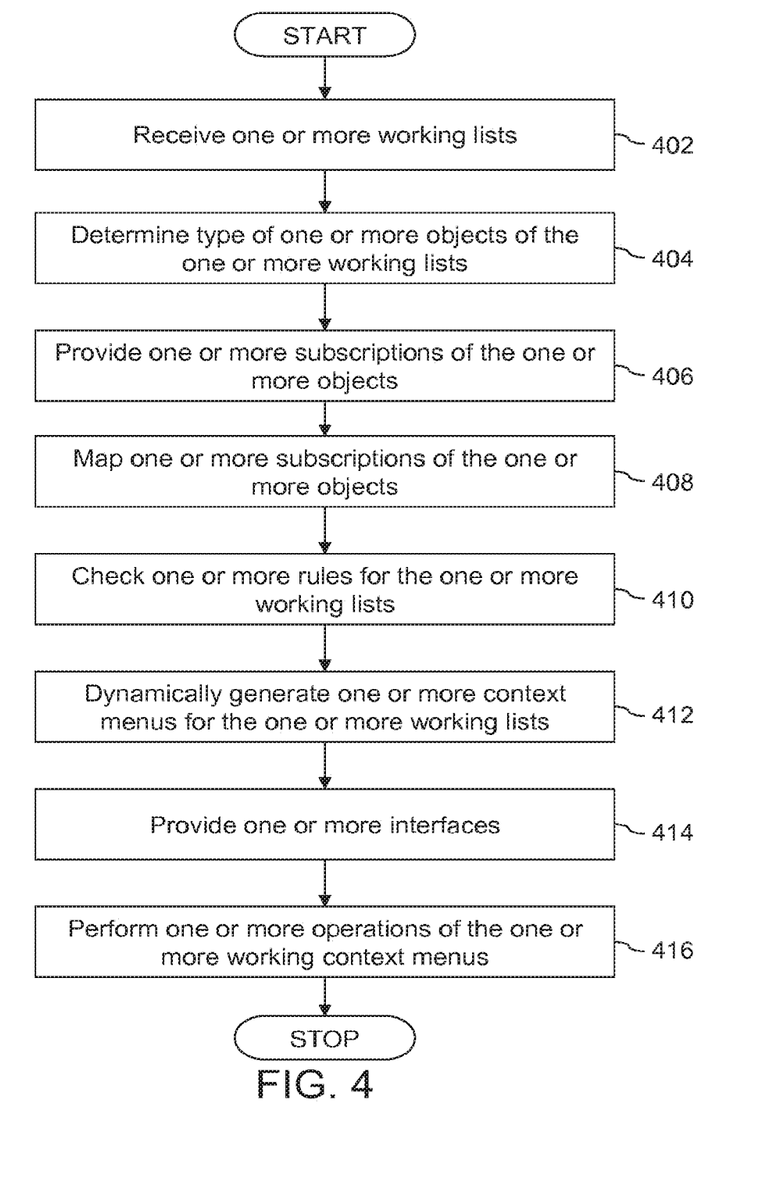
FIG. 4 is a flowchart illustrating a method for object based browsing in applications in accordance with an embodiment of the invention.

FIG. 4 is a flowchart illustrating a method for object based browsing in applications in accordance with an embodiment of the invention. One or more devices, for example, one or more devices 102, include one or more applications running on them. One or more users working on the one or more devices select one or more objects. In an embodiment of the invention, before selecting the one or more objects, the one or more users may input their login details. The one or more objects constitute one or more working lists for the one or more users. At step 402, the one or more working lists are received. Thereafter at step 404, types of the one or more objects of the one or more working lists are determined.

At step 406, one or more subscriptions of the one or more objects are then provided. In an embodiment of the invention, the one or more subscriptions are provided based on the login details of the one or more users.

In an embodiment of the invention, at step 408, the one or more subscriptions of the one or more objects may then be mapped to find all the possible combinations formed by the subscriptions. For example, if a working list includes six objects QUI, OU2, OW, ODI and OD2, OM with QUI and OU2 being user type objects (OU), OW being a workspace type object (OW), ODI and OD2 being document type objects (OD), and OM being a meeting type object (OM), then subscriptions for OU may include add the user object, delete the user object, and rename the user object. The subscriptions for the OW may include add to the workspace and remove from the workspace. The subscriptions for the OD may include send the document, edit the document and remove the document. The subscriptions for the OM may include send meeting request. The mapping may then result in the possible combinations including add users to the workspace, send the documents to the users, send meeting request to the users, remove the documents from the workspace, remove the users from the workspace, and the like.

In an embodiment of the invention, the one or more subscriptions may be mapped by using Extensible Markup Language (XML).

In an embodiment of the invention, at step 410, one or more rules for the one or more working lists are checked. The one or more rules are checked to include one or more operations in one or more context menus. For example, an exemplary rule R1 may be OU (>=2), OW (1), OD (>1) and OM (>=1)=>M1. Rule R1 may be read as if at least two instances of type OU, one instance of type OW, at least two instances of object 03, and at least one instance of OM are present then include operation M1 in context menu for the working list.

At step 412, the one or more context menus for the one or more working lists are dynamically generated based on the checking of the one or more rules. In an embodiment of the invention, the one or more context menus may include list of all allowed one or more operations that may be performed with the one or more objects included in the one or more working lists. In another embodiment of the invention, the number of allowed one or more operations to be included in the one or more context menus may be defined based on preferences of the one or more users. In yet another embodiment of the invention, the number of allowed one or more operations to be included in the one or more context menus may be predefined.

In an embodiment of the invention, the allowed one or more operations included in the one or more context menus may be computed on a server, for example, server 104. In another embodiment of the invention, the allowed one or more operations included in the one or more context menus may be computed on the one or more devices by using Javascript, ActiveX, and the like. In yet another embodiment of the invention, the allowed one or more operations included in the one or more context menus may be computed partially on the server and partially on the one or more devices.

In an embodiment of the invention, at step 414 one or more user interfaces may be provided to display the one or more context menus. In an embodiment of the invention, the one or more user interfaces may be provided at any point of time by using a special control, for example, Control+Y.

In an embodiment of the invention, the one or more user interfaces may include special controls, for example, Control+X, to edit the one or more working lists.

In an embodiment of the invention, the one or more users then select the one or more operations from the one or more context menus. Thereafter at step 416, the one or more operations are performed. In an embodiment of the invention, the one or more operations may be performed simultaneously.

In an embodiment of the invention, the one or more operations may be performed on a server side.

The method described above is explained with the help of the following example. An administrator, hereinafter referred to as an admin user, logins to an application and views a list of service requests. The admin user then selects one or more service requests, such as, SRI, SR2, SR3, and SR4 based on their priorities. A table including a list of users is then displayed. The admin user then selects the users, such as, UI and U2, for assigning the service requests. The admin user may also select one document D I. SRI, SR2, SR3, SR4, D I, UI, and U2 constitute a working list of the admin user. When admin user selects the objects, the types of objects are determined. The subscriptions of the service request type object and user type object, which are accessible to the admin user, based on the login details are then provided. The one or more subscriptions are then mapped to find all possible combinations. Further, one or more rules associated with the working list are also checked. The one or more rules that are checked may be defined by the admin user or they may be predefined. All or some of the possible combinations of the subscriptions are then displayed as context menus through various user interfaces. The context menus include a list of the possible operations that the admin user may perform using the working list.

In an embodiment of the invention, when the admin user selects U1 then a context menu including operation T1="ASSIGN any one service request", operation T2="ASSIGN any two service requests" and operation T3="Send D1" may be displayed. The admin user may then select the operation T2 and any two service requests, SRI and SR2 may get assigned to U1. Further, a server may then start performing the operation T2 and completing the service requests. The admin user may simultaneously also select the operation T3 which may then be performed simultaneously with the operation T2 by the server.

In an embodiment of the invention, when the admin user after selecting the operation T2 selects U2 then another context menu including operation T4="ASSIGN SR3", T5="ASSIGN SR4" and T6="ASSIGN SR3 and SR4" may be generated. The admin user may then select the operation T4. The server then starts performing the operation T4 simultaneously with the operation T2 and the operation T3.

In an embodiment of the invention, when the operations T2, T3 and T4 are being performed the admin user may select one more user U3. The working list of the admin user may now include SR4, U1, U2, U3 and D1. Yet another context menu including operation T7="ASSIGN SR4" and operation T8="Send D1" may then be displayed. The admin user may then select the operation T8 to send D1 to U3.

In an embodiment of the inventions, the user interfaces including the context menus may be displayed automatically or the admin user may use a special control, such as Control+Y, to view them at any point of time. The working list may also be edited by the admin user by using another special control at any point of time.

The method described above includes different steps involved in object based browsing in the applications. The method may include a greater or a fewer number of steps than those included in FIG. 4.

In an embodiment of the invention, the method described in FIG. 4 may be implemented using a computer program product. Examples of the computer program product include but are not limited to memory devices, tapes, disks, cassettes, integrated circuits, servers, online softwares, download links, installation links, and online links.

The dynamic generation of the one or more context menus provides efficient object based browsing in the applications. The one or more user interfaces allows the one or more users to view the context menus at any point of time and perform one or more operations. Further, the one or more users are not required to learn navigation sequences of the applications as the one or more context menus are generated based on selection of the one or more objects. Moreover, addition of new features in the one or more context menus does not require training the one or more users.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A method for generating dynamic context menu commands for selected object combinations, the method comprising:
    receiving, using a processor, a selection of a plurality of objects from a set of objects, wherein:
        the plurality of objects comprises a first object having a first object type;
        the plurality of objects comprises a second object having a second object type;
        the first object type is different from the second object type; and
        the first object and the second object are in a selected state at a same time;
    determining, using the processor, sets of actions available for each object type represented in the plurality of objects, wherein the sets of actions comprise:
        a first set of actions available for the first object type;
        a second set of actions available for the second object type;
    mapping, using the processor, together the sets of actions available for each object type represented in the plurality of objects to generate menu commands for the plurality of objects, wherein the menu commands comprise a first command that:
        is based on at least one of the first set of actions of the first object and at least one of the second set of actions of the second object; and
        uses the first object and the second object as arguments; and
    generating, using the processor, a graphical context menu comprising the first command.

2. The method of claim 1, wherein:
    the first object is from a first database table; and
    the second object is from a second database table.

3. The method of claim 1, further comprising receiving a selection of the first object from among the plurality of objects, wherein:
    the graphical context menu is generated in response to receiving the selection of the first object; and
    the graphical context menu includes ones of the menu commands that include the first object as an argument, the ones of the menu commands including the first command.

4. The method of claim 1, wherein the selection of the plurality of objects are organized as a working list.

5. The method of claim 1, wherein the plurality of objects comprises one or more selections from the group consisting of: a calendar entry, a user, a document, a group, and an email.

6. The method of claim 1, further comprising:
    receiving a user-defined rule that uses ones of the plurality of objects as arguments and generates a second command for the graphical context menu;
    determining that the user-defined rule is satisfied by the plurality of objects; and
    adding, in response to determining that the user-defined rule is satisfied by the plurality of objects, the second command to the graphical context menu.

7. The method of claim 1, wherein mapping together the sets of actions available for each object type represented in the plurality of objects to generate menu commands for the plurality of objects comprises:
    determining possible combinations that can be formed by combining the sets of actions.

8. The method of claim 1, wherein the graphical context menu comprises a list of allowed commands that may be performed using the plurality of objects.

9. The method of claim 1, wherein a predefined number of commands are displayed in the graphical context menu.

10. The method of claim 1, further comprising:
    receiving, at a user device, a selection of the first command;
    executing the first command on a user device;
    receiving, at the user device, a selection of a second command from the graphical context menu; and
    executing the second command on a server that is different from the user device.

11. The method of claim 1, wherein:
    the first object comprises a workspace;
    the second object comprises a document; and
    the first command comprises adding the document to the workspace.

12. The method of claim 1, wherein:
    the first object represents a user;
    the second object comprises a service request; and
    the first command comprises assigning the service request to the user.

13. A system comprising:
    one or more processors; and
    one or more memory devices comprising:
        instructions for receiving a selection of a plurality of objects from a set of objects, wherein:
            the plurality of objects comprises a first object having a first object type;
            the plurality of objects comprises a second object having a second object type;
            the first object type is different from the second object type; and
            the first object and the second object are in a selected state at a same time;
        instructions for determining sets of actions available for each object type represented in the plurality of objects, wherein the sets of actions comprise:
            a first set of actions available for the first object type;
            a second set of actions available for the second object type;
        instructions for mapping together the sets of actions available for each object type represented in the plurality of objects to generate menu commands for the plurality of objects, wherein the menu commands comprise a first command that:
            is based on at least one of the first set of actions of the first object and at least one of the second set of actions of the second object; and
            uses the first object and the second object as arguments; and
        instructions for generating a graphical context menu comprising the first command.

14. A non-transitory, computer-readable medium comprising:
    instructions for receiving, using a processor, a selection of a plurality of objects, wherein:
        the plurality of objects includes objects having different object types; and
        the plurality of objects are in a selected state at a same time;
    instructions for accessing, using the processor, one or more rules for generating one or more context menus, wherein each of the one or more rules includes:

a logical expression; and an operation for a context menu, wherein the operation may be included in a graphical context menu based on an evaluation of the logical expression;

instructions for determining, using the processor, one or more operations by evaluating the logical expression for each of the one or more rules; and instructions for causing the one or more operations to be displayed in the graphical context menu associated with the selection of the plurality of objects.

15. The non-transitory, computer-readable medium of claim 14, wherein the logical expression of at least one of the one or more rules comprises a number of instances of each of the different object types.

16. The non-transitory, computer-readable medium of claim 14, further comprising instructions for including the operation for the context menu for at least one of the one or more rules in the graphical context menu if the corresponding logical expression evaluates as true.

17. The non-transitory, computer-readable medium of claim 14, further comprising instruction for comparing a number of instances of a first object type to a first predefined threshold to a number of instances of a second object type to a second predefined threshold.

18. The non-transitory, computer-readable medium of claim 14, further comprising instructions for determining a number of operations in the graphical context menu by accessing a user preference.

19. The non-transitory, computer-readable medium of claim 14, further comprising instructions for receiving a combination of keyboard inputs to edit the selection of the plurality of objects.

20. The non-transitory, computer-readable medium of claim 14, further comprising instructions for selecting the one or more rules for generating the one or more context menus based on the different object types in the plurality of objects.

* * * * *

UNITED STATES PATENT AND TRADEMARK OFFICE
CERTIFICATE OF CORRECTION

| | |
|---|---|
| PATENT NO. | : 10,521,083 B2 |
| APPLICATION NO. | : 15/583796 |
| DATED | : December 31, 2019 |
| INVENTOR(S) | : Vedula |

It is certified that error appears in the above-identified patent and that said Letters Patent is hereby corrected as shown below:

In the Drawings

On sheet 3 of 4, in FIG. 3, under Reference Numeral 304b, Line 4, delete "ASSSIGN" and insert -- ASSIGN --, therefor.

In the Specification

In Column 3, Line 30, delete "SRI" and insert -- SR1 --, therefor.

In Column 3, Line 30, delete "user s" and insert -- users --, therefor.

In Column 3, Line 30, delete "UI" and insert -- U1 --, therefor.

In Column 3, Line 31, delete "SRI" and insert -- SR1 --, therefor.

In Column 3, Line 32, delete "SRI" and insert -- SR1 --, therefor.

In Column 3, Line 33, delete "UI" and insert -- U1 --, therefor.

In Column 3, Line 38, delete "I 02." and insert -- 102. --, therefor.

In Column 3, Line 52, delete "ruleR" and insert -- rule R --, therefor.

In Column 3, Line 52, delete "(Oil)=" and insert -- (0|1)= --, therefor.

In Column 3, Line 53, delete "RuleR" and insert -- Rule R --, therefor.

In Column 4, Line 25, delete ""ASSIGNS. No." and insert -- "ASSIGN S. No. --, therefor.

In Column 4, Line 53, delete "QUI," and insert -- OU1, --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,521,083 B2

In Column 4, Line 53, delete "ODI" and insert -- OD1 --, therefor.

In Column 4, Line 53, delete "QUI" and insert -- OU1 --, therefor.

In Column 4, Line 55, delete "ODI" and insert -- OD1 --, therefor.

In Column 5, Line 9, delete ">MI." and insert -- >M1. --, therefor.

In Column 5, Line 11, delete "03," and insert -- O3, --, therefor.

In Column 5, Line 58, delete "SRI," and insert -- SR1, --, therefor.

In Column 5, Line 61, delete "UI" and insert -- U1 --, therefor.

In Column 5, Line 62, delete "D I. SRI," and insert -- D1. SR1, --, therefor.

In Column 5, Line 63, delete "D I, UI," and insert -- D1, U1, --, therefor.

In Column 6, Line 15, delete "SRI" and insert -- SR1 --, therefor.